US009607296B2

(12) United States Patent
Rasband et al.

(10) Patent No.: US 9,607,296 B2
(45) Date of Patent: Mar. 28, 2017

(54) SYSTEM FOR AUTOMATION AND EFFICIENT EXECUTION OF TASKS RELATED TO MOBILE POS IN RETAIL BUSINESS

(71) Applicants:Paul B. Rasband, Lantana, FL (US); Manjuprakash R. Rao, Bangalore (IN); Sreenath K. Ramanna, Bangalore (IN); Surajit Borah, Bangalore (IN); Stewart E. Hall, Wellington, FL (US)

(72) Inventors: Paul B. Rasband, Lantana, FL (US); Manjuprakash R. Rao, Bangalore (IN); Sreenath K. Ramanna, Bangalore (IN); Surajit Borah, Bangalore (IN); Stewart E. Hall, Wellington, FL (US)

(73) Assignee: Tyco Fire & Security GmbH, Neuhausen AM Rheinfall (CH)

(*) Notice: Subject to any disclaimer, the term of this patent is extended or adjusted under 35 U.S.C. 154(b) by 0 days.

(21) Appl. No.: 14/546,377

(22) Filed: Nov. 18, 2014

(65) Prior Publication Data

US 2015/0262158 A1    Sep. 17, 2015

(30) Foreign Application Priority Data

Mar. 13, 2014  (IN) .............................. 701/DEL/2014

(51) Int. Cl.
*G06G 1/12* (2006.01)
*G06Q 20/20* (2012.01)
*G06Q 30/00* (2012.01)
*G06Q 20/32* (2012.01)
*G06K 15/00* (2006.01)

(52) U.S. Cl.
CPC ....... *G06Q 20/202* (2013.01); *G06Q 20/3224* (2013.01); *G06Q 30/00* (2013.01); *G06Q 30/01* (2013.01)

(58) Field of Classification Search
USPC ......................................................... 705/21
See application file for complete search history.

(56) References Cited

U.S. PATENT DOCUMENTS

| 5,814,799 A | 9/1998 | Swartz et al. |
| 7,988,045 B2 * | 8/2011 | Connell, II .......... G06Q 20/208 235/383 |

(Continued)

FOREIGN PATENT DOCUMENTS

| EP | 2008226 A2 | 12/2008 |
| WO | 2011057106 A2 | 5/2011 |
| WO | 2013116894 A1 | 8/2013 |

*Primary Examiner* — Garcia Ade
(74) *Attorney, Agent, or Firm* — Fox Rothschild LLP; Robert J. Sacco; Carol E. Thorstad-Forsyth

(57) ABSTRACT

Method for managing mobile point of sale (mPOS) operations using a wireless network to detect location data includes capturing video data of one or more customers within a retail store premises. The video data is analyzed to determine one or more customer behavior indicators potentially indicating a need for mPOS services. The location data is used to correlate the customer behavior indicators with the one or more customers. The method also involves determining a probability that at least one of the customers will be requesting mPOS services within a predetermined interval of time.

20 Claims, 3 Drawing Sheets

(56) References Cited

U.S. PATENT DOCUMENTS

| | | |
|---|---|---|
| 8,359,221 B2 | 1/2013 | Gala |
| 8,418,919 B1 * | 4/2013 | Beyda ................. G07G 1/0054 235/375 |
| 8,600,804 B2 | 12/2013 | Ramchandani et al. |
| 2002/0040313 A1 | 4/2002 | Hunter et al. |
| 2005/0055223 A1 | 3/2005 | Khosla |
| 2007/0226056 A1 | 9/2007 | Belanger et al. |
| 2011/0178863 A1 | 7/2011 | Daigle |
| 2012/0066065 A1 | 3/2012 | Switzer |
| 2012/0290349 A1 | 11/2012 | Burkhart |
| 2013/0046632 A1 | 2/2013 | Grigg et al. |
| 2013/0138517 A1 | 5/2013 | Khan |
| 2014/0019199 A1 | 1/2014 | Appel |
| 2014/0039950 A1 | 2/2014 | Appel |
| 2014/0121967 A1 * | 5/2014 | Anbalagan ......... G01C 21/3476 701/540 |

\* cited by examiner

SYSTEM FOR AUTOMATION AND EFFICIENT EXECUTION OF TASKS RELATED TO MOBILE POS IN RETAIL BUSINESS

CROSS REFERENCE TO RELATED APPLICATIONS

This application claims the benefit of Indian Patent Application No. 701/DEL/2014 filed Mar. 11, 2014, which are herein incorporated by reference.

BACKGROUND OF THE INVENTION

Statement of the Technical Field

The inventive arrangements relate to systems and methods for managing mobile point of sale operations in a retail setting.

Description of the Related Art

Wireless communication technologies and increasing use of devices such as smartphones present increased opportunities for retail stores to interact with customers. For example, International Patent Publication number WO 2013116894 A1 to Cohen et al. (hereinafter "Cohen et al.") discloses a customer relationship management (CRM) system that uses scanners to detect the arrival of smartphones carried by customers in certain areas. The CRM system in Cohen discloses an arrangement in which specific user devices are differentiated by reading a Media Access Control (MAC) address of Wi-Fi enabled mobile devices. The data acquired in this way is sent to a network server and stored on a database. Cohen et al. also discloses that a registration process can be used to link a particular person to their user device. An in-store device in Cohen can detect a user device in a defined area of a store and can track at least one activity characteristic of a user of the user device. The in-store device can also initiate a CRM activity for the user based on the at least one activity characteristic. The activity characteristics described in Cohen et al. include: movement of the user between sections of the defined store area; an amount of time spent by the user in a section of the defined store area; and/or updated location(s) of the user.

Operations on the retail store floor are becoming increasingly complex, particularly as the use of handheld devices such as smart phones and tablets becomes more widespread. Among the areas of change in retail practice is sales finalization, commonly referred to as POS (point-of-sale). Recently some retailers have introduced mobile POS (mPOS) service in which a store employee meets a customer somewhere on the sales floor and uses a handheld device (e.g., phone or tablet) to create an invoice, transact a payment step (e.g., using the customer's credit card), create a receipt (usually electronic), and send details of the sale to the store's backend system for processing (e.g., updating the store's sales totals and perpetual inventory databases).

SUMMARY OF THE INVENTION

The invention concerns a method for managing mobile point of sale (mPOS) operations. The method involves collecting location data for one or more customers within the retail store premises. The method further involves capturing video data of one or more customers within the retail store premises. The video data is analyzed to determine one or more customer behavior indicators potentially indicating a need for mPOS services. The location data is then used to correlate the customer behavior indicators with the one or more customers. The method also involves determining a probability that at least one of the customers will be requesting mPOS services within a predetermined interval of time. Based on this analysis, one or more store employees are assigned to certain mPOS tasks.

According to another aspect, a plurality of portable wireless communication devices (PWCDs) in communication with at least one wireless access point (WAP) are used to obtain customer location data and employee location data in the retail store. The customer location data and employee location data are provided to an mPOS server. One or more customer behavior indicators are determined for the customers in the retail store. The customer behavior indicators comprise events or conditions other than location which are known to be associated with a potential customer need for mPOS services. The mPOS server is then used to analyze at least the customer location data, the employee location data, and one or more of the customer behavior indicators. Based on the analysis, the mPOS server determines for at least one of the customers a probability that the customer will need mPOS services within a predetermined interval of time. The mPOS server can also select a preferred store employee to provide mPOS services. Finally, the mPOS server can communicate an assignment notification to the preferred store employee, where such assignment notification directs the preferred store employee to a defined location proximate a selected customer.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
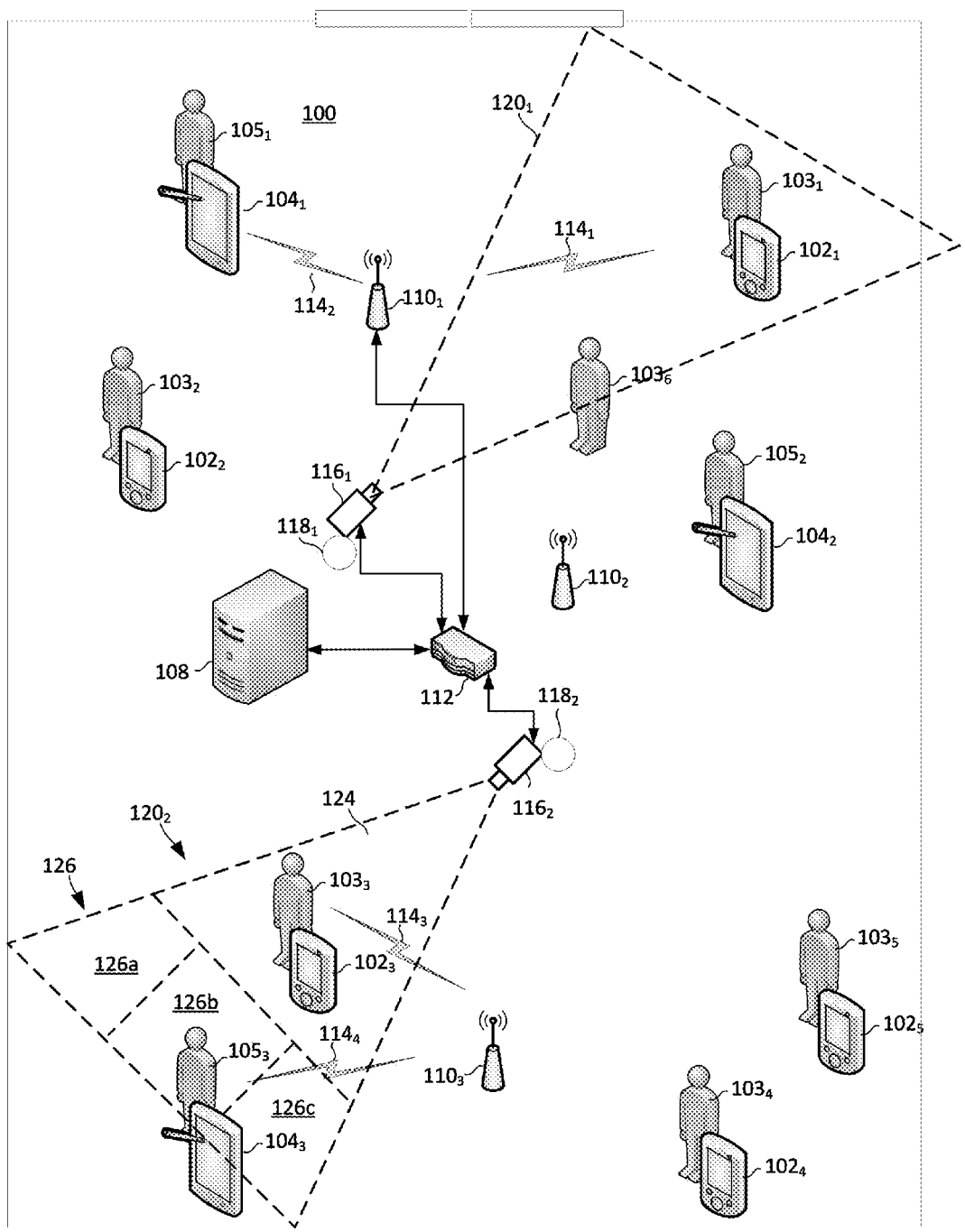
FIG. 1 is a drawing that is a conceptual representation of a retail store space that is useful for understanding the operation of an automated mPOS assignment system.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

In order to make mobile point of sale (mPOS) solutions practical inside a retail store, a shopper who wishes to quickly pay for their selected items must be able to quickly find a sales associate who has authority and means to perform the mPOS transaction. From the retailer's perspective, employee productivity is increased when the employees currently assigned to mPOS duties can quickly find store customers ready to checkout. If waiting or line queuing is involved in this process, much of the purpose of mPOS service is defeated. Thus, retailers wishing to implement mPOS in their stores are faced with the problem of getting together, in a time and labor efficient manner, the mPOS staff on duty and the shoppers ready to use mPOS service.

The current invention deals with systems and methods of scheduling retail employee work on the store floor as it relates to mobile POS activity. These methods can include monitoring of store associate position and activity on the sales floor, monitoring of customer location and activity which might indicate the impending need for mPOS service, responding to customer request for mPOS service, and other service need forecasting processes. More particularly, the invention concerns a method for management of mPOS operations in a retail store setting.

The method involves using a plurality of customer portable wireless communication devices (PWCDs) in communication with at least one wireless access point (WAP). The customer PWCDs and WAPs are used to obtain customer location data of one or more customers in the retail store and employee location data of one or more store employees in the retail store. The customer location data and employee location data are provided to an mPOS server. One or more customer behavior indicators are also determined for the customers in the retail store. The customer behavior indicators include events or conditions, other than location-based events and conditions, which are associated with a potential customer need for mPOS services.

The mPOS server analyzes the customer location data, the employee location data, and one or more of the customer behavior indicators and based on the analysis performs certain actions. These actions include determining for at least one of the customers a probability that the customer will require mPOS services within a predetermined interval of time. The actions also include selecting a preferred store employee to provide mPOS services. Finally, the actions include communicating an assignment notification to the preferred store employee. The assignment notification directs the preferred store employee to a defined location proximate a selected customer.

Imaging devices are advantageously used to obtain images of the one or more customers in the retail store, and one or more of the customer behavior indicators are derived from the video image data. For example, video analytics are advantageously used for this purpose. The video analytics can be used to identify customers having certain characteristics which indicate that they will likely be in need of mPOS services. As one example, a shopper in a store carrying a few items in their hand, but having no shopping basket or cart can serve to indicate that the customer will need mPOS services in the immediate future. The video image data and/or customer behavior indicators are then correlated with specific customer location data. In this way, the customer behavior indicator is correlated with specific customers.

Customers can also use their PWCDs to generate mPOS checkout requests. These checkout requests are communicated to the WAP and are then forwarded to the mPOS server. According to one aspect of the invention, the mPOS checkout request can serve as one of the customer behavior indicators.

According to another aspect of the invention, one or more employee assignment indicators are obtained and evaluated for store employees. The employee assignment indicators comprise events or conditions other than location which are to be evaluated when determining which employee to assign to an mPOS task. The selection of the preferred store employee who will provide mPOS services can be based at least in part on the one or more employee assignment indicator associated with each employee. Exemplary employee assignment indicators can include a current mPOS activity status of a particular store employee. The current mPOS activity status in such a scenario can specify whether the particular store employee is currently engaged in an mPOS task that was assigned and/or begun at an earlier time. The mPOS activity status can also specify a percentage completion of the previously begun mPOS task tjat the particular employee is currently transacting.

Other employee assignment indicators are also possible. For example an employee assignment indicator can include a predetermined customer preference value that specifies a degree of preference a particular customer has for a particular store employee. Alternatively, or in addition, an employee assignment indicator can include a predetermined store preference value that specifies a degree of preference a particular store has for assigning a particular store employee to a mPOS task. A further customer behavior indicator is advantageously based on a percentage completion of a predetermined shopping list for a particular customer.

The analyzing step described above can further involve determining a queue factor. This can involve an evaluation of a likelihood that two or more of the customer in a predetermined area will be requesting mPOS services within a predetermined interval of time. When customer behavior indicators for a plurality of customers indicate that they are likely to request mPOS services in a predetermined time interval, then the assignment of an employee to an area proximate such customers can be given a greater priority.

Referring now to FIG. 1, there is illustrated a retail store space 100 in which a plurality of customers $103_1$, $103_2$, $103_3$, $103_4$, $103_5$, $103_6$ are present. For convenience, these customers are sometimes referred to generically herein as customers $103_x$. One or more of the customers (e.g. customers $103_1$, $103_2$, $103_3$, $103_4$, $103_5$) who are present in the store can have or possess portable wireless communication devices (PWCDs) $102_1$, $102_2$, $102_3$, $102_4$, $102_5$. For convenience, these PWCDs may sometimes be referred to generically herein as PWCDs $102_x$. As is known in the art the PWCDs $102_x$ can be equipped with wireless transceiver components and drivers to facilitate participating in short range wireless networks. Examples of such devices can include tablet computers or personal digital assistants (PDA) equipped with wireless network access capability (e.g. Wi-Fi). Alternatively, such devices can include wireless smartphones equipped with Wi-Fi capability. Such devices are well known in the art and therefore will not be described here in detail.

The customer PWCDs can include one or more software applications which are useful for facilitating management of mPOS tasks as described herein. For example, the PWCDs $102_x$ can include at least one software application which is capable of interacting with an mPOS server 108. For example, the computer software application can facilitate communication of PWCD identifying data, user registration information, user personal identification data and mPOS message data. In some embodiments, the software application can also facilitate generation of customer shopping lists. The lists can be manually entered by a user, or can be generated in any other suitable manner. When shopping, customers can mark items on the list as such items are placed in a shopping basket or the like. Accordingly, the software application can determine when the customer has completed or nearly completed their shopping.

Also present within the retail store space 100 are a plurality of store employees $105_1$, $105_2$, $105_3$ who are provided with possess employee PWCDs $104_1$, $104_2$, $104_3$ (collectively referred to herein as $104_x$) which are equipped for participating in a short range wireless network. For example, these devices can include tablet computers or personal digital assistants (PDA) equipped with wireless network access capability (e.g. Wi-Fi). Alternatively, such devices can include wireless smart-phones equipped with Wi-Fi capability. Such devices are well known in the art and therefore will not be described here in detail. The employee PWCDs possessed by the store employees can be provided with one or more software applications suitable to facilitate one or mobile point of sale (mPOS) tasks or services. An mPOS service can include any activity in which a store employee meets a customer somewhere on the sales floor and uses a handheld device (e.g., PDA, smart-phone or tablet) to create an invoice, transact a payment step (e.g., using the customer's credit card), create a receipt (usually electronic), and/or send details of the sale to the store's backend system for processing (e.g., updating the store's sales totals and perpetual inventory databases).

The retail store premises can include one or more wireless access points $110_1$, $110_2$ $110_3$ which are equipped for wireless network communications with the customer PWCDs $102_x$ and employee PWCDs $104_x$ as described above. Accordingly, exemplary wireless links $114_1$, $114_2$, $114_3$, $114_4$ are shown in FIG. 1 to illustrate that a plurality of wireless links are established between certain wireless devices and the wireless access points. To avoid obscuring the invention, not all of the wireless links are shown in FIG. 1. The wireless access points are in communication with an mPOS server 108 through suitable wired or wireless connections. Accordingly, the mPOS server 108 can communicate with each of the customer PWCDs $102_x$ and employee PWCDs $104_x$.

The wireless communications described herein can include any of several well-known networks types. Such wireless networks can include wireless wide area networks (WWANs) and wireless local area networks (WLANs). WWANs may implement a radio technology such as general packet radio service (GPRS), 3 GPP Long Term Evolution (LTE), LTE-Advanced (LTE-A), or the like. WLANs may implement a radio technology such as IEEE 802.11 (Wi-Fi), Bluetooth or the like. Any suitable wireless network can be used for purposes of the present invention. Also, it should be appreciated that a limited number of wireless devices and wireless access points are shown in FIG. 1 to illustrate the inventive concepts disclosed herein. However, more or fewer of such devices can be used and the devices shown are merely presented to illustrate the concept.

One or more imaging devices $116_1$, $116_2$ are provided in the retail store premises 100 to capture video images from within the retail store. The video image data can be communicated to the mPOS server for certain video analytics processing as described below. However, the invention is not limited in this regard and in some embodiments it can be preferable to instead communicate the video image data to a dedicated video server (not shown) for such video analytics processing. In such a scenario, pertinent data pertaining derived from such video analytics can then be communicated from the dedicated video server to the mPOS server. Alternatively, such processing can be handed directly at the mPOS server. The purpose and details concerning the video analytics processing will be explained below in further detail.

Each of the imaging devices $116_1$, $116_2$ is arranged to capture and communicate image data for video analysis. The imaging devices are preferably positioned at locations within the retail store premises 100 to facilitate capture of image data showing customers and their activities within the store. As such, the cameras are preferably mounted in locations (e.g. near the ceiling) having suitable vantage points to facilitate such video image capture. Only two imaging devices are shown in FIG. 1 but the invention is not limited in this regard and other imaging devices may be used. A sufficient number of imaging devices can be provided to facilitate capture of customer images at substantially all locations within the retail store premises. Further, one or more of the imaging devices can arranged to move in an automated way so as to scan the area within the retail premises. This can be accomplished by means of a motor $118_1$, $118_2$ attached to a camera base which causes the imaging device to move continuously or in response to commands received from the mPOS server 108.

Figure 2:
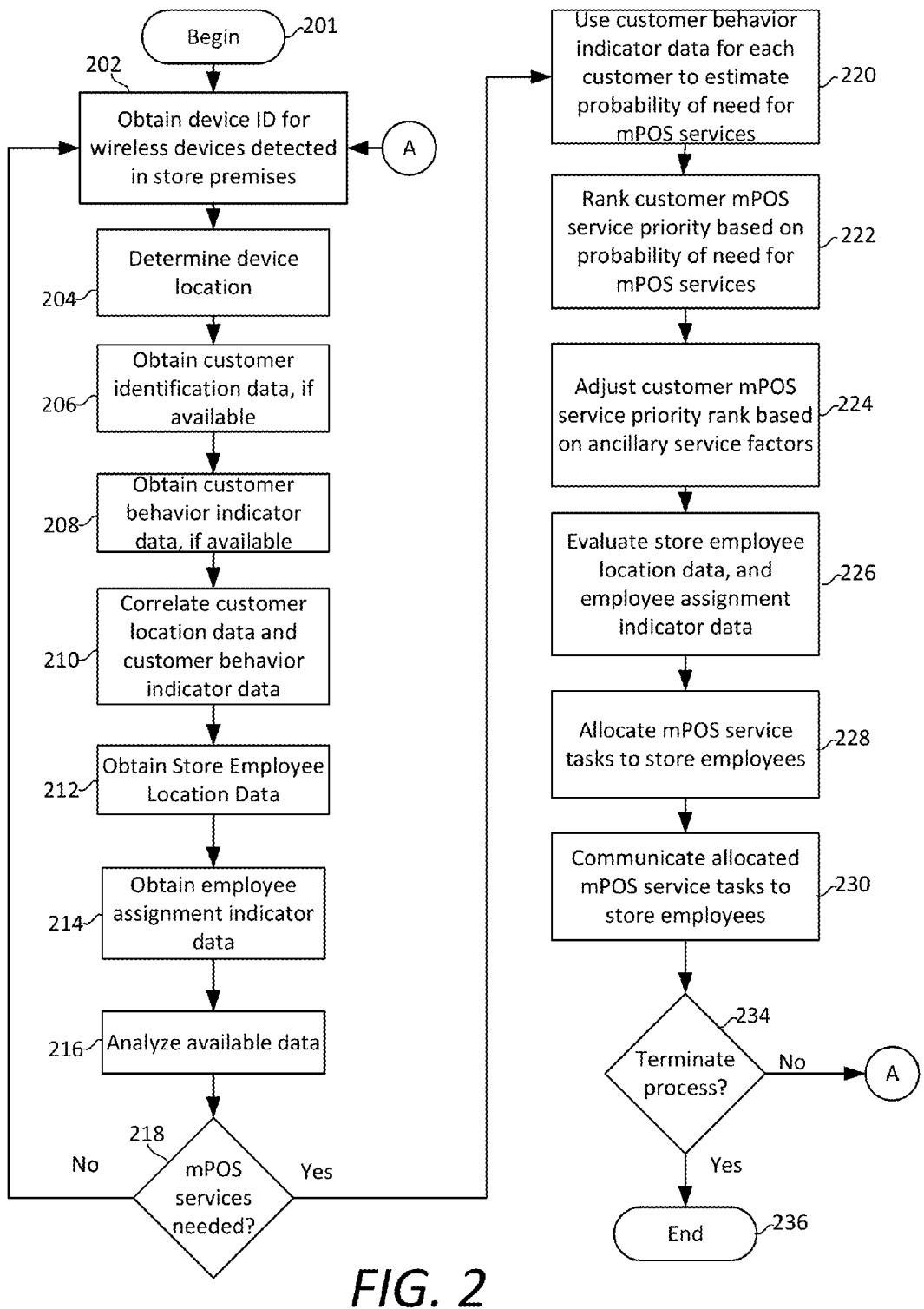
FIG. 2 is a flowchart that is useful for understanding a process for implementing an automated mPOS assignment system.

Referring now to FIG. 2, there is shown a flowchart that is useful for understanding the inventive arrangements. The process begins at 201 and continues at steps 202 and 204 where customers PWCDs within the store premises are identified and located using at least one sensor network. For example, when a user $103_x$ arrives within the retail store space 100, the customer PWCD $102_x$ in the possession of the customer is detected by the wireless network comprised of wireless access points $110_1$, $110_2$, $110_3$. Specific PWCDs possessed by users (customers) can be differentiated from each other by any suitable means. For example, each customer PWCD will generally have a device identifier, such as a Media Access Control (MAC) address, or some other suitable identifying data associated with the device. This data for each device can be accessed by the system using by using the wireless access points $110_1$, $110_2$, $110_3$.

The actual location of each customer PWCD device within the store premises can be obtained in a variety of different ways. For example, these methods for estimating location can involve use of one or more wireless access points (e.g. wireless access points $110_1$, $110_2$) within the retail store space 100. These methods can involve (1) determining an angle of arrival of one or more radio signals received from the PWCD, (2) evaluation of signal strength as an indicator of distance and (3) proximity detection. One or more of these methods can be used alone or in concert to determine a precise location of a PWCD within the store premises. Each of these methods are well known in the art and therefore will not be described here in detail. However, a brief explanation of these alternative methods is provided as an aid to understanding the invention.

If the angle of arrival method is used to determine device location, one or more wireless access points $110_1$, $110_2$, $110_3$ can be disposed above the floor of the retail premises. Customers carrying PWCDs $102_x$ are assumed to be walking on the floor of the retail store premises. Consequently it is reasonable to assume that a wireless device $102_x$ resides at some distance (e.g. one meter) from the floor of the retail store. This defines one surface in which the device is presumed to reside. A wireless access point $110_1$, $110_2$, $110_3$ with a suitable antenna arrangement can measure the angle of arrival of radio signals received from each device. The angle of arrival can be measured with respect to both the X and Y axis so that an angle of arrival trace line may be drawn from the wireless access point to the surface defined one meter above the floor. The trace line will intersect the surface at a single point which then represents the location of the wireless mobile device. Using this technique, the location of the wireless mobile device 102 can be determined with only a single wireless access point.

If signal strength is used to estimate distance between a wireless access point $110_1$, $110_2$, $110_3$, then the strength of signals received at the wireless access point from mobile device $102_x$ can be used as an indicator of the distance between the wireless mobile device and the particular wireless access point. Using only a single wireless access point, the position of the PWCD can then be estimated. More particularly, the position of the customer PWCD can be estimated as being someplace on the surface of a sphere. The wireless access point is the center of the sphere and the sphere is defined by a radius having a specific length which is determined based on signal strength. If it is further assumed that the device is carried at a distance of one meter from the floor of the retail store, then this will define a second surface. The surface 1 meter above the floor will intersect with the sphere to define an ellipse. If a second wireless access point is used to generate a second ellipse, then the second ellipse will intersect with the first ellipse in two locations. Thus there will be two possible locations estimated where the PWCD $102_x$ may be located. A third wireless access point can be used to generate a third ellipse, and thereby resolve a single possible location of the PWCD.

As noted above, the third method for estimating the location of each customer-possessed PWCD $102_x$ can involve proximity detection. With the proximity detection method, multiple wireless access points $110_1$, $110_2$, $110_3$ are generally needed within the retail store premises to determine an approximate location of each particular PWCD. The sensitivity of each wireless access point can be adjusted to detect PWCDs within a relatively small range and this range will serve as an estimate of PWCD location whenever the PWCD is detected by a particular access point.

Other methods are also possible for determining PWCD location. For example, many PWCD devices include GPS receivers these GPS receivers can sometimes be used to determine a location within a store premises. In those instances where a GPS receiver is not available in the PWCD and/or when building structures interfere with GPS reception, other methods can be used to determine a location. For example, cell tower based location estimating methods can be used for this purpose. These methods involve communication with wireless cellular communication towers to estimate position. GPS and cellular-based position estimating systems are well known in the art and therefore will not be described here.

After each customer PWCD has been identified and located within the store, the system attempts at 206 to determine an identity of each customer for which a PWCD identifier (e.g. MAC address) has been obtained. For example, identifying data regarding the customer PWCDs $102_x$ can be communicated to server(s) 108 via a wired network such as a local area network (LAN) or a wide area network (WAN), or via a wireless network. The server 108 can compare the identifying data for each PWCD to a database to determine if any of the PWCD identifying information corresponds to a PWCD of a known customer. If so, then the PWCD is associated with the specific known customer and any relevant information pertaining to the customer can be accessed for mPOS purposes as hereinafter described. Information linked to a particular PWCD can be collected by any suitable means. For example, it can be collected as a result of a previous mPOS transaction, voluntary customer registration, and so on. Personal identification and other types of information for specific customers can then be stored in a database associated with server 108 and may be used in connection with future mPOS transactions for purposes as described herein. For example, customer preferences, average purchase amount, frequency of store visits, brand preference and employee preferences (i.e. which employee they prefer to work with) can be stored on the system. If a PWCD identifier does not correspond to any information currently in the database, and the customer has elected not to provide such information to the server 108, then the customer can be treated as an anonymous customer.

In step 208, customer behavior indicator data is accessed for one or more customers (anonymous customers and known customers) who are present in the retail store space 100. As used herein, a customer behavior indicator can include any information available to the server 108 which is useful for estimating a probability or likelihood that a particular customer is presently (or will soon be) in need of mPOS assistance. Customer behavior indicators can include user-directed indications, such as a user initiated request for mPOS assistance. Such a request can be transmitted from the customer's PWCD to the server 108 by means of the wireless network (e.g. wireless access points $110_1$, $110_2$). Customer behavior indicators can also include automatically generated indications including messages automatically generated by a customer PWCD $102_x$. Such messages can indicate that a customer will soon be in need of mPOS services. Automated messages as described herein can be generated when an mPOS software application on the PWCD determines that a user has collected in his shopping basket all or most of the items contained on his shopping list. For example, an automated message can be communicated to the mPOS server 108 when an mPOS software application determines that a user has collected a certain percentage of the items on his shopping list.

Customer behavior indicators can also be obtained by utilizing image data and video analytics. For example, one or more of the imaging devices $116_1$, $116_2$ can be used to obtain images of the one or more customers $103_x$ in the retail store. A detailed discussion of video analytics methods is beyond the scope of this invention. However, it is sufficient to note that automated analysis of video image can be used to derive one or more customer behavior indicators from the video image data. As an example, video analytics can be used to identify one or more customers $103_x$ who are carrying one or more items in their hands, but do not have a basket or cart. Such a scenario can indicate that the customer intends to purchase only a relatively few number of items and is presently ready or will soon be ready for mPOS services. Accordingly, when this condition is detected, a customer behavior indicator can be generated specifying the particular condition which has been identified. The customer behavior indicator can then be evaluated by server 108 to determine a likelihood that a particular customer is presently in need of mPOS services, or will be in need of such services shortly.

When customer behavior indicators are communicated from the PWCD, it is a relatively simple matter to correlate the customer behavior indicator with the location of the particular customer PWCD. For example, the device identifying information or customer identifying information can be used to correlate the received message with a particular PWCD. The location of such PWCD can then be determined using the methods described above with respect to step 204. However, when video analytics are used to discern customer behavior indicators, an additional correlation step is necessary to correlate a particular customer behavior derived from a video image with a corresponding PWCD location in the store. Accordingly, step 210 involves correlation of customer location data and with customer behavior indicators derived from indirect methods, such as video analytics.

The correlation step can be accomplished using any suitable method. For example, video image data generated by each camera can be electronically tagged with metadata to indicate a general location of an area being imaged. The metadata can be communicated with the image data to the server 108. The metadata can identify a particular imaging device $116_1$, $116_2$ from which the video image originated. The metadata can also indicate an orientation or camera angle associated with the imaging device at the time that an image was acquired. The metadata for camera angle can be dynamically provided from one or more position sensors associated with motors $118_1$, $118_2$. Accordingly, a field of view $120_1$, $120_2$ can be determined for each imaging device at any given moment. The field of view will correspond to an area of a retail store premises. Video analytics can be used in conjunction with such metadata to more precisely estimate a location of customers appearing in each particular image. For example, locations of customers in a foreground area 124 of an image can be distinguished from customers in a background area 126. A more detailed estimate of location within each image can be provided by dividing foreground and/or background areas into various sectors. For example, in FIG. 1, background area 126 can be sub-divided into a plurality of sectors 126a, 126b, 126c. Accordingly, a location of a person appearing in a particular sector (e.g. sector 126a) of an image can be more precisely estimated.

The estimated position of each person as determined using video analytics is correlated with the customer behavior indicator data obtained in step 208. At this point, server 108 will have all of the available customer behavior indicators derived from video analytics, and each such customer behavior indicator will be linked to an estimated location within retail store premises 100. The locations associated with each customer behavior indicators derived from video analytics can them be compared to the locations of each customer PWCD $102_x$ as determined in step 204. If a location associated with a particular customer behavior indicator (as derived using video analytics) is sufficiently close to a known location of a PWCD $102_x$ then the customer behavior indicator is assigned to the particular customer in possession of that PWCD. For example, such an assignment could be made when a location associated with a particular customer behavior indicator is within 2 meters of a PWCD location determined in step 208.

In some instances, a server 108 may have no record of a customer or PWCD at a particular location to which the customer behavior indicator can be assigned. For example, this can occur when the video analytics processing described herein generates a customer behavior indicator for a particular customer in the retail store who does not have a PWCD. This can also occur in situations when the customer's PWCD is turned off. In such a scenario, a record of a new anonymous customer is automatically created by the server 108, and the particular customer behavior indicator can be assigned to that anonymous customer at the identified location. Accordingly, one or more of the customer records maintained by the server 108 can be generated exclusively based on video analytic data using the techniques described herein.

In step 212 store employee location data is obtained by the sever 108. This information can be obtained using techniques which are the same or similar to those described herein with respect to customer location data. In step 216 the server analyzes the available customer behavior indicator data to determine with respect to each know customer a likelihood that such customer is in presently in need of mPOS services, or will be in need of such services during some predetermined service interval in the near future. For example, the server 108 can evaluate for each customer a likelihood that such customer will need mPOS services during the next 30 second or one minute period. As part of data analysis, the server 108 can determine for each customer a probability that such customer will need mPOS services during the predetermined service interval. The customers can then be ranked in accordance with the degree of likelihood that they are in need of mPOS services.

The process continues on to step 218 where server 108 determines whether the analysis step has identified any customers that are potentially in need of mPOS services. If not (218: No) then the process returns to step 202. Such as scenario might occur, for example, under conditions where there are presently no customers in the retail store. However, if one or more customers in step 218 are determined to be potentially in need of mPOS services (218: Yes), then the process continues on to step 220. At step 220 the customer behavior indicator data for each customer is used to estimate a likelihood or probability that such customer is presently in need of mPOS services or will need such services in the near future as defined by a predetermined mPOS service interval. The estimate can be determined using any suitable method.

In estimating the probability that a customer is or will need mPOS services, one or more customer behavior indicators can be considered for each customer. In such an analysis, some customer behavior indicators can be more heavily weighted for consideration than others. For example a specific customer request for mPOS services would be weighted heavily (accorded greater significance) as it is a very reliable indicator that a customer needs mPOS services. An indication that a shopping list is 90% complete could be given a heavier weight than an indication that a shopping list is 80% complete. Customer behavior indicators obtained by means of video analytics could also be weighted. For example a customer behavior indicator derived from a video image showing a few items for purchase in a customer's hand, and no shopping cart present, could be given a heavier weighting if the customer is also walking towards a store exit. If a particular customer behavior indicator was derived from video analytics, but with low confidence due to poor image quality or other reasons, that customer behavior indicator could be given a lesser weighting and accorded less significance in the analysis process.

Once a probability has been accorded to each customer with regard to their estimated mPOS need, the process continues on to step 222 where the customers are ranked in accordance with an mPOS service priority. Customers who are deemed to be most likely in need of mPOS services are accorded the highest service priority rank. Generally speaking, the customers with the highest service priority rank will be the ones that the system has determined should be provided mPOS services first.

In step 224, adjustments can be made to mPOS service priority rank based on one or more ancillary service factors. The ancillary service factors include any considerations which a retail store management may consider relevant for adjusting a customer service priority rank. In an embodiment of the invention, ancillary service factors can be derived from information associated with particular customer records. For example, a customer service priority rank of known preferred customer could be adjusted to ensure that they receive faster service. Service priority rank could also be adjusted for customers if video analytics show that they have more or fewer than a certain number of items to purchase.

After any adjustments are made to service priority rank, the system continues to step 226 at which point an evaluation is made of store employee location data and/or employee assignment indicator data. Employee location data is important when determining which employee to assign to mPOS service tasks. Proximity of employees to customers in need of mPOS services is naturally an important factor to consider for enhancing efficiency of mPOS services. But other factors can also be important for purposes of determining which employees to assign. Accordingly, employee assignment indicators include any events or conditions other than location which are useful to evaluate when determining which employee to assign to an mPOS task.

An employee assignment indicator can be based on a current mPOS activity status of a particular store employee. The current mPOS activity status will specify whether the particular store employee is currently engaged in a previously begun mPOS task. If so, then that employee may not be optimal for assignment to a new mPOS task at the moment. In such a scenario, the mPOS activity status could further specify a percentage completion of the previously begun mPOS task the particular employee is currently transacting. Such information can be useful for determining whether the particular employee will soon be available for a new task assignment. An employee assignment indicator can also include a predetermined customer preference value that specifies a degree of preference a particular identified customer has for a particular store employee. A further employee assignment indicator can include a predetermined store preference value that specifies a degree of preference a particular store has for assigning a particular store employee to an mPOS task.

In step 228 mPOS service tasks are allocated to store employees based on the evaluation in step 226. Thereafter, in step 230 the mPOS service tasks are communicated to store employees $105_1$, $105_2$, $105_3$. For example, this can be accomplished using wireless message communications from wireless access points $110_1$, $110_2$, $110_3$ to one or more employee PWCD $104_1$, $104_2$, $104_3$.

Various operations performed with respect to the flowchart in FIG. 2 can be realized in one computer system (e.g. server 108). Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 3:
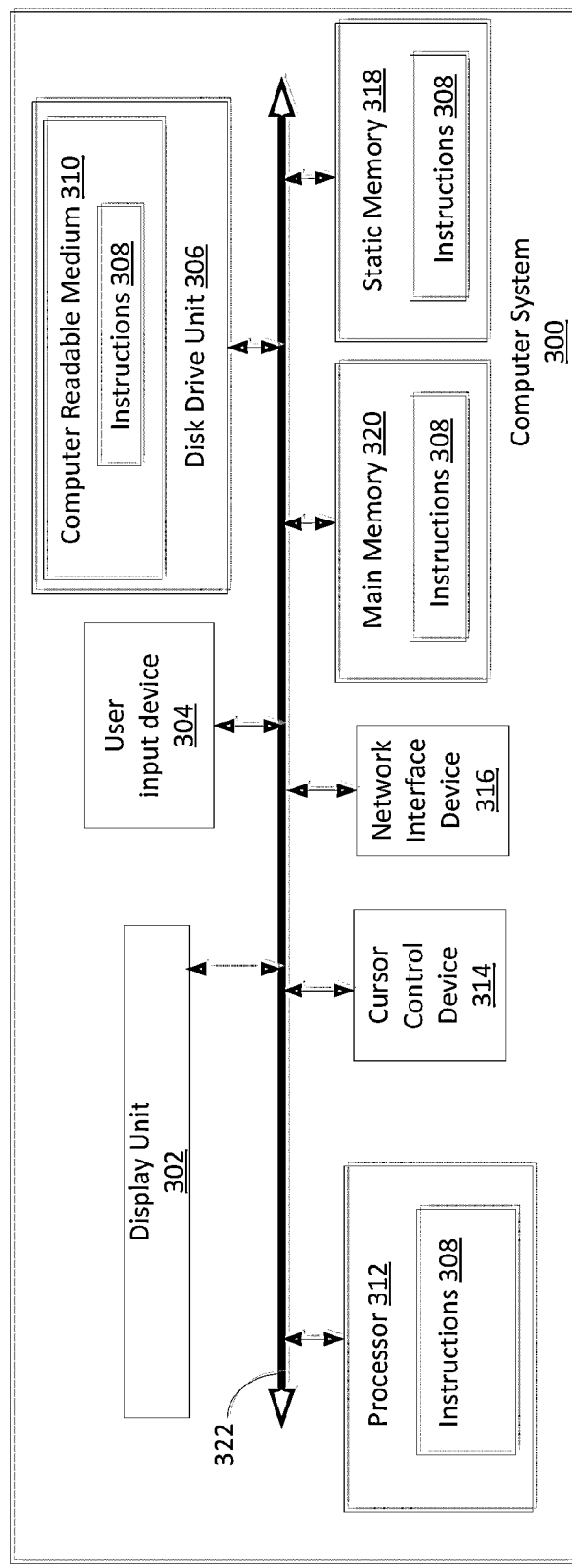
FIG. 3 is a block diagram that is useful for understanding an mPOS server computer system.

Referring now to FIG. 3, a computer system 300 includes a processor 312 (such as a central processing unit (CPU), a disk drive unit 306, a main memory 320 and a static memory 318, which communicate with each other via a bus 322. The computer system 300 can further include a display unit 302, such as a video display (e.g., a liquid crystal display or LCD), a flat panel, a solid state display, or a cathode ray tube (CRT)). The computer system 300 can include a user input device 304 (e.g., a keyboard), a cursor control device 314 (e.g., a mouse) and a network interface device 316.

The disk drive unit 306 includes a computer-readable storage medium 310 on which is stored one or more sets of instructions 308 (e.g., software code) configured to implement one or more of the methodologies, procedures, or functions described herein. The instructions 308 can also reside, completely or at least partially, within the main memory 320, the static memory 318, and/or within the processor 312 during execution thereof by the computer system. The main memory 320 and the processor 312 also can constitute machine-readable media.

Those skilled in the art will appreciate that the computer system architecture illustrated in FIG. 3 is one possible example of a computer system that can be used to implementing the inventive arrangements. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. In the various embodiments of the present invention a network interface device 316 connected to a network environment communicates over the network using the instructions 308.

While the computer-readable storage medium 310 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for management of mobile point of sale (mPOS) operations in a retail store setting, comprising:
   using a plurality of portable wireless communication devices (PWCDs) in communication with at least one wireless access point (WAP) to obtain customer location data of one or more customers in the retail store and employee location data of one of more store employees in the retail store;
   using one or more imaging devices mounted to vantage point locations in the retail store to obtain images of the one or more customers in the retail store;
   tagging the images with metadata to indicate a location within the retail store which corresponds to at least one portion of a scene captured in the images;
   applying video analytics to process the images of the customers in an mPOS server to determine video image data which includes one or more customer behavior indicators for the customers in the retail store, the customer behavior indicators comprising events or conditions other than location which are known to be associated with a potential customer need for mPOS services;
   using the metadata to correlate the video image data with the customer location data to associate the customer behavior indicators with specific customers;
   analyzing with an mPOS server the customer location data, the employee location data, and one or more of the customer behavior indicators;
   determining on the basis of the one or more customer behavior indicators for at least one of the customers a probability of the customer requiring mPOS services within a predetermined interval of time,
   selecting a preferred store employee to provide mPOS services; and
   responsive to the selecting, automatically generating with the mPOS server a communication comprising an assignment notification to the preferred store employee, said assignment notification directing the preferred store employee to a defined location proximate a selected customer to perform an mPOS task.

2. The method according to claim 1, wherein the scene captured in each of the images is defined as comprising a plurality of scene sectors which are specified by the metadata, each scene sector comprising a portion of the scene and corresponding to a defined location within the retail store.

3. The method according to claim 2, further comprising using the scene sector information included in said metadata to facilitate the correlating step.

4. The method according to claim 1, further comprising receiving at the mPOS server at least one mPOS checkout request, and using the mPOS checkout request as a customer behavior indicator.

5. The method according to claim 1, further comprising determining at least one employee assignment indicator for the one or more store employees, the employee assignment indicator comprising events or conditions other than location to be evaluated when determining which employee to assign to the mPOS task, wherein the selecting of the preferred store employee to provide mPOS services is further based on the at least one employee assignment indicator.

6. The method according to claim 5, wherein the at least one employee assignment indicator includes a current mPOS activity status of a particular store employee, the current mPOS activity status specifying whether the particular store employee is currently engaged in a previously begun mPOS task.

7. The method according to claim 6, wherein the mPOS activity status further specifies a percentage completion of the previously begun mPOS task the particular employee is currently transacting.

8. The method according to claim 5, wherein the at least one employee assignment indicator includes a predetermined customer preference value that specifies a degree of preference a particular customer has for a particular store employee.

9. The method according to claim 5, wherein the at least one employee assignment indicator includes a predetermined store preference value that specifies a degree of preference a particular store has for assigning a particular store employee to the mPOS task.

10. The method according to claim 1, wherein at least one customer behavior indicator is determined by determining a percentage completion of a predetermined shopping list for a particular customer.

11. The method according to claim 1, wherein the analyzing step further comprises determining a queue factor by evaluating a likelihood that two or more of the customer in a predetermined area will be requesting mPOS services within a predetermined interval of time, and wherein the assigning step is further based on the queue factor.

12. A method for management of mobile point of sale (mPOS) operations in a retail store setting, comprising:
   using a wireless data network to determine location data indicating a location of one of more customers in a retail store;
   providing one or more video imaging devices mounted to vantage point locations within the retail store;
   capturing with the one or more video imaging devices video data of the one or more customers within the retail store, the video data including associated metadata which corresponds to a scene location within the retail store which is associated with the video data;
   receiving the location data and the video data in an mPOS server;
   analyzing with the mPOS server at least the video data to determine one or more customer behavior indicators exclusive of location-based indicators which potentially indicate a need for mPOS services;

using the location data and the metadata to correlate the customer behavior indicators with the one or more customers;

determining on the basis of the one or more customer behavior indicators a probability that at least one of the one or more customers will be requesting mPOS services within a predetermined interval of time; and based on said determining, automatically generating a data message directing at least one store employee to perform an mPOS task.

13. The method according to claim 12, further comprising, assigning the at least one store employee to the mPOS task for a particular customer based at least in part on the probability that the particular customer will be requesting mPOS services within the predetermined interval of time.

14. The method according to claim 13, further comprising automatically determining a location of a plurality of store clerks within the retail store, wherein the at least one store employee who is assigned to the mPOS task is selected based on the location of that store employee within the retail store relative to the particular customer requiring mPOS assistance.

15. The method according to claim 13, wherein the store employee who is assigned to the mPOS task is selected based on at least one employee assignment indicator for store employees, the employee assignment indicator comprising events or conditions, other than location, which are to be evaluated when determining which store employee to assign to the mPOS task.

16. The method according to claim 15, wherein the at least one employee assignment indicator includes a current mPOS activity status of a particular store employee, the current mPOS activity status specifying whether the particular store employee is currently engaged in an mPOS task.

17. The method according to claim 16, wherein the current mPOS activity status further specifies a percentage completion of a previously begun mPOS task a particular employee is currently transacting.

18. The method according to claim 15, wherein the at least one employee assignment indicator includes a predetermined customer preference value that specifies a degree of preference a particular customer has for a particular store employee.

19. The method according to claim 15, wherein the at least one employee assignment indicator includes a predetermined store preference value that specifies a degree of preference a particular store has for assigning a particular store employee to the mPOS task.

20. The method according to claim 12, further comprising, wherein the at least one store employee assigned to the mPOS task for the particular customer is further based at least in part on an ancillary service factor which is used to adjust an mPOS service priority of a particular customer.

* * * * *